United States Patent
Hillforth et al.

(10) Patent No.: US 9,288,963 B2
(45) Date of Patent: Mar. 22, 2016

(54) DEVICE AND METHOD FOR REMOVING DIRT FROM A FLOOR

(71) Applicant: LELY PATENT N.V., Maassluis (NL)

(72) Inventors: Mikael Hillforth, Alta (SE); Huibrecht Johannes Arjen Van Den Beukel, Maassluis (NL); Peter Henry Clements, Dordrecht (NL)

(73) Assignee: LELY PATENT N.V., Maassluis (NL)

( * ) Notice: Subject to any disclaimer, the term of this patent is extended or adjusted under 35 U.S.C. 154(b) by 683 days.

(21) Appl. No.: 13/682,893

(22) Filed: Nov. 21, 2012

(65) Prior Publication Data
US 2013/0139849 A1 Jun. 6, 2013

(30) Foreign Application Priority Data
Nov. 21, 2011 (NL) .................................. 2007830

(51) Int. Cl.
*A01K 1/01* (2006.01)
*A01C 3/04* (2006.01)
(Continued)

(52) U.S. Cl.
CPC *A01K 1/01* (2013.01); *E01H 1/006* (2013.01); *E01H 1/105* (2013.01); *E01H 1/106* (2013.01);
(Continued)

(58) Field of Classification Search
CPC ..... A01K 1/01; A01K 1/0128; A01K 1/0132; A01K 1/0139; A01C 3/04; E01H 1/00; E01H 1/006; E01H 1/008; E01H 5/00; E01H 5/04; E01H 5/045; E01H 5/08; E01H 5/09; E01H 5/096; E01H 5/098; E01H 15/00; E01H 1/105; E01H 1/106

USPC ......................... 15/3, 93.1; 119/442, 447, 451
See application file for complete search history.

(56) References Cited

U.S. PATENT DOCUMENTS 1,328,973 A * 1/1920 Stowell .................... E01H 5/09
  37/208
1,404,140 A * 1/1922 Qwam .................... E01H 5/08
  198/307.1

(Continued)

FOREIGN PATENT DOCUMENTS

| FR | 2644187 A | 9/1990 |
| GB | 2104042 A | 3/1983 |
| WO | 9731524 A1 | 9/1997 |

(Continued)

OTHER PUBLICATIONS

Dutch Search Report with English translation attached and Written Opinion issued on Jul. 3, 2012.

*Primary Examiner* — Mark Spisich
(74) *Attorney, Agent, or Firm* — Hoyng Rokh Monegier LLP; Ramin Amirsehhi; David P. Owen (57) ABSTRACT

A device for removing dirt from a floor includes a carrier frame moveable over the floor, a motor mounted on the carrier frame, and a rotating body drivable by the motor and connected with the carrier frame. Several shovel-holders for shovelling dirt from the floor are mounted on the rotating body spaced apart from each other in the peripheral direction, are moveable along a path along the floor, and each have an open end in the rotation direction of the rotating body. A sweeper device for sweeping dirt out of one of the shovel-holders is arranged along the path of the shovel-holders on the carrier frame at a position substantially stationary in relation to the carrier frame, and is fitted with a sweeper element which, on rotation of the rotating body, moves between the shovel-holders and sweeps through one of the shovel-holders in order to sweep out dirt therefrom.

24 Claims, 8 Drawing Sheets

(51) Int. Cl.
  *E01H 1/00* (2006.01)
  *E01H 15/00* (2006.01)
  *E01H 1/10* (2006.01)
  *E01H 5/04* (2006.01)
  *E01H 5/09* (2006.01)

(52) U.S. Cl.
  CPC . *A01C 3/04* (2013.01); *E01H 5/045* (2013.01); *E01H 5/09* (2013.01); *E01H 5/096* (2013.01); *E01H 15/00* (2013.01)

(56) References Cited

U.S. PATENT DOCUMENTS

| 1,430,962 | A | * | 10/1922 | Esposito | E01H 5/08 37/239 |
|---|---|---|---|---|---|
| 4,914,773 | A | | 4/1990 | Ham | |

FOREIGN PATENT DOCUMENTS

WO  0048455 A1  8/2000

\* cited by examiner

DEVICE AND METHOD FOR REMOVING DIRT FROM A FLOOR

CROSS REFERENCE TO RELATED APPLICATIONS

This application claims priority from Netherlands application number 2007830 filed on 21 Nov. 2011, which is incorporated hereby incorporated by reference in its entirety.

BACKGROUND OF THE INVENTION

1. Field of the Invention

The invention to a device for removing dirt from a floor, for example the floor of a stall.

2. Description of the Related Art

Dairy cattle are in practice kept in the stall for long periods. The dung produced by the cattle falls directly onto the floor of the stall. Also other dirt collects on the stall floor, such as hay, sawdust, feed and similar. Because of the urine from the cattle, the dung is usually wet. The cows' hooves become soft if the cattle are kept standing in wet dung for a long periods, which can give rise to inflammation. Dirt on the stall floor therefore has a negative effect on the health of the cattle. Therefore the stall floor is cleaned regularly.

WO 97/31524 discloses a device for removing dung from the floor of a stall. The dung is sucked up. The composition of cattle dung can vary widely. If the dung is relatively thick, it is difficult to remove this dung by suction. Therefore there is a risk that the thick dung will remain on the stall floor—the stall floor is then not cleaned properly. The dung which remains on the stall floor can over the course of time cause health problems for the cattle.

BRIEF SUMMARY OF THE INVENTION

One object of the invention is an improved device for removing dirt from a floor, for example from the floor of a stall, in particular a device which is suitable for removing relatively heavy and/or sticky dirt such as dirt containing relatively thick dung.

This object is achieved by a device for removing dirt from a floor, for example the floor of a stall, which device comprises:
  a carrier frame which is moveable over the floor,
  a motor which is mounted on the carrier frame,
  a rotating body which is rotatable in one direction of rotation about a first substantially horizontal rotation axis and is connected with the carrier frame, which rotating body is drivable by the motor,
  several shovel-holders for shovelling the dirt from the floor, which shovel-holders are mounted on the rotating body spaced apart from each other in the peripheral direction and which shovel-holders on rotation of the rotating body move along a path which runs at least partly along the floor, and which shovel-holders each comprise a trough-shaped wall which delimits an internal receiving cavity for receiving the shovelled dirt, and which shovel-holders each comprise an open end which is substantially oriented in the rotation direction of the rotating body,
  a sweeper device for sweeping the dirt in each case out of one of the shovel-holders on rotation of the rotating body, which sweeper device is arranged along the path of the shovel-holders on the carrier frame at a position which is substantially stationary in relation to the carrier frame, which sweeper device is fitted with a sweeper element which is moveable and driveable such that the sweeper element, on rotation of the rotating body, for each shovel-holder which passes the sweeper device, moves from a starting position outside the path of the shovel-holders into the path of the shovel-holders, through the open end of the passing shovel-holder into the internal receiving cavity of the passing shovel-holder and then on through the internal receiving cavity of the passing shovel-holder in order to sweep out at least a quantity of the dirt shovelled up by the passing shovel-holder, and the sweeper element then moves out of the passing shovel-holder and then away out of the path of the shovel-holders in order to allow the passing shovel-holder to pass by the sweeper device.

During operation, the shovel-holders of the device rotate with the driven rotating body. The shovel-holders each shovel a quantity of dirt from the floor. Shovelling the dirt is effective for different types of dirt, including relatively heavy and/or sticky dirt, for example dirt containing relatively thick dung. If the shovelled dirt has a tendency to stick in the shovel-holders, the sweeper device guarantees that the shovelled dirt is at least partly removed from the shovel-holders. Thus after shovelling up the dirt, each shovel-holder is at least partially emptied so that the shovel-holder can shovel up another quantity of dirt from the floor. On each revolution the shovel-holders shovel up a quantity of dirt from the floor and part of the quantity of dirt or largely the entire quantity of dirt is removed from the shovel-holders. The device according to the invention is thus suitable for removing different types of dirt, largely preventing any relatively thick dung, for example, from remaining on the stall floor.

In one embodiment, the sweeper element is moveable and driveable such that the sweeper element, on rotation of the rotating body, for each shovel-holder which passes the sweeper device, in each case moves back through the path of the shovel-holders to the starting position outside the path of the shovel-holders after the passing shovel-holder has passed by the sweeper device. The sweeper element is returned to the starting position outside the path of the shovel-holders before the approaching shovel-holder which, viewed in the rotation direction of the rotating body, is the first to follow the passing shovel-holder which has passed the sweeper device. Thus each shovel-holder is swept clear in the same way. This simplifies the design of the sweeper device and the shovel-holders and is favourable for the reliability of the device.

Also according to the invention it is possible that the sweeper element sweeps through a shovel-holder both out of the starting position to the position outside the path of the passing shovel-holder and back to the starting position. Thus the shovelling speed can be increased, but this leads to a more complex construction.

In one embodiment, the shovel-holders are arranged substantially in a circle spaced apart in a peripheral direction, wherein the path of the shovel-holders is substantially circular. The rotating body is for example designed as a wheel which is rotatable about a substantially horizontal rotation axis, whereby the shovel-holders are attached to the wheel.

Instead of a wheel, the rotating body can also be designed differently, for example as a crawler track. The path of the crawler track can then run over a predetermined distance substantially parallel to the floor. The shovel-holders attached to the crawler track in this case move over the predetermined distance substantially parallel along the floor, so the shovel-holders can shovel up dirt particularly effectively. Another part of the path of the crawler track can be made approximately round so that the shovel device can sweep the shovel-holders empty in the same way.

In one embodiment the device is a vehicle, wherein the carrier frame can travel in a direction of travel over the floor. It is possible that the vehicle comprises a drive device to drive the vehicle. The vehicle however need not be self-propelling.

The vehicle can furthermore be designed to be steerable autonomously. In this case the vehicle can clean the floor automatically.

In one embodiment the shovel-holders, on rotation of the rotating body, swivel from a lower shovel position to an upper release position and back, and wherein the sweeper device is arranged at the upper release position of the shovel-holders. The sweeper element, on rotation of the rotating body into the upper release position of each shovel-holder, removes a quantity of dirt therefrom. Thus gravity cooperates in removing dirt from the shovel-holders. The shovel-holders pass the sweeper device in the upper release position.

It is possible that the device is fitted with a catchment tray for catching the dirt swept from each shovel-holder on passing by the sweeper device, and wherein the catchment tray is fitted with a catchment opening arranged below the sweeper device. The catchment opening is located on a top of the catchment tray. The dirt which is removed from each shovel-holder by the sweeper element lands in the catchment tray. After the dirt has been removed, the shovel-holder can again shovel up a quantity of dirt from the floor.

In one embodiment the design is fitted with a storage tank which is connected with the catchment tray via a passage opening, and wherein the catchment tray is fitted with a displacement element for moving the dirt captured in the catchment tray to the storage tank. The use of the displacement element in the catchment tray prevents clogging of the passage opening by hardening of dirt, such as relatively thick dung. This is favourable for the reliability of the device.

The catchment tray and the displacement element can be designed in various ways. For example, the catchment tray has a substantially cylindrically peripheral wall in which a side opening is provided to form the catchment opening on the top of the catchment tray, and wherein the displacement element comprises a transport screw to transport the dirt captured in the catchment tray through the passage opening to the storage tank. The dimensions of the transport screw can be adapted to the dimensions of the substantially cylindrical peripheral wall such that the dirt captured in the catchment tray can be pushed through the passage opening to the storage tank.

It is possible that the first axis of rotation of the rotating body runs substantially parallel to a longitudinal axis of the device. To shovel dirt from the floor, the device is moved in the direction of the longitudinal axis, for example by driving the device designed as a vehicle over the floor. The shovel-holders mounted on the rotating body thus rotate about the first rotation axis which runs parallel to the longitudinal axis. The shovel-holders then move over the floor transversely in relation to the longitudinal axis to shovel dirt. As a result the device can remove dirt from the floor in relatively wide paths.

In one embodiment, the carrier frame on its side facing the floor is fitted with collection bars for collecting the dirt present on the floor on movement of the device over the floor, and wherein the path of the shovel-holders runs between the collection bars. The collection bars delimit a collection chamber. During movement of the carrier frame over the floor, for example by driving the device designed as a vehicle over the floor, the dirt present on the floor is guided between the collection bars to the collection chamber. The dirt can accumulate locally in the collection chamber. The part of the path of the shovel-holders which borders the floor runs through the collection chamber. The shovel-holders in the lowest shovel position are positioned in the collection chamber between the collection bars. Thus the shovel-holders can shovel up a relatively large quantity of dirt.

It is possible that the sweeper element is drivable by the motor. In this case both the rotating body and the sweeper element can be driven by the motor. For example, the common motor has an output motor shaft connected with a drive belt which drives both the rotating body and the sweeper element. The displacement element in the catchment tray can also be driveable by the motor, for example by the displacement element also being connected with the drive belt. By using a common motor to drive the rotating body, the sweeper element and where applicable the displacement element, costs are limited.

In one embodiment, the sweeper element which is rotatable about a second rotation axis is connected with the sweeper device, wherein the sweeper element is moveable and driveable such that the sweeper element, on its rotation about the second rotation axis and on rotation of the rotating body about the first rotation axis, for each shovel-holder which passes the sweeper device, performs one complete revolution in each case from the starting position outside the path of the shovel-holders.

From the starting position outside the path of the shovel-holders, the sweeper element by its rotation is swept through one of the shovel-holders. The sweeper element here rotates over an angle of around 180°. After the sweeper element has moved out of the path of the shovel-holders, the swept shovel-holder passes by the sweeper element. The sweeper element at the same time rotates further behind the swept shovel-holder and in front of the shovel-holder filled with shovelled dirt which, viewed in the rotation direction of the rotating body, is the first after the swept shovel-holder which has passed by. The sweeper element here rotates over an angle of around 180° back to the starting position outside the path of the shovel-holders. The sweeper element therefore in each case performs a complete revolution between the shovel-holders, sweeping through one of the shovel-holders each time to remove at least a quantity of dirt therefrom.

It is possible that the rotating body and the sweeper element are driveably connected with the motor such that, when the rotating body and the sweeper element are driven by the motor, the sweeper element rotates N× as fast about the second rotation axis as the rotating body rotates about the first rotation axis, wherein N is the number of shovel-holders of the rotating body. Both the rotating body and the sweeper element in this case can be driven by the common motor. The output shaft of the motor is for example connected by means of a transmission mechanism with the sweeper element and the rotating body. The transmission mechanism is here designed such that the output shaft of the motor is connected in a first transmission ratio with the sweeper element and in a second transmission ratio with the rotating body, wherein the first and second transmission ratios differ mutually by a factor of N. The sweeper element therefore rotates with a relatively high rotation speed between the shovel-holders so that each passing shovel-holder is evacuated.

In one embodiment, the trough-shaped wall of each passing shovel-holder has a curved inner surface, the curvature of which is such that the sweeper element, on its rotation about the second rotation axis and on rotation of the rotating body about the first rotation axis, moves through the internal receiving cavity of the passing shovel-holder at a substantially constant distance from the curved inner surface in order to sweep out at least a quantity of the dirt shovelled up by the passing shovel-holder.

The substantially constant distance is for example between 1 mm and 5 cm. By adapting the curved inner surface of the shovel-holder to the combined rotation movements of the rotating body and the sweeper element, the sweeper element can evacuate the shovel-holder substantially completely. This is favourable for the capacity of the device.

The trough-shaped wall of the shovel-holder can also be designed in various ways. For example the trough-shaped wall is substantially rigid. In this case the trough-shaped wall can be made of metal or plastic. It is however also possible that the trough-shaped wall is substantially flexible. If the sweeper element during its rotation and on rotation of the rotating body touches the trough-shaped wall, the trough-shaped wall in this case can yield somewhat resiliently. Thus the risk of damage is reduced.

It is possible that the device comprises a vertical longitudinal plane which is determined by a vertical plane through the first horizontal rotation axis of the rotating body, and wherein the centre of rotation of the sweeper element which is determined by the second rotation axis is arranged at a distance which is greater than 0 from the vertical longitudinal plane.

The sweeper element is rotatable about the second rotation axis. The centre of rotation of the sweeper element is determined by the intersection of the second rotation axis with the sweeper element. The centre of rotation of the sweeper element is at a distance from the vertical longitudinal plane of the device, i.e. the second rotation axis is offset in relation to the first horizontal rotation axis of the rotating body. As the sweeper element has a specific length, the rotation of the sweeper element can be set by adjusting this distance so that the sweeper element is substantially in the centre of the shovel-holder in the upper release position of the passing shovel-holder.

In one embodiment the second rotation axis of the sweeper element runs obliquely in relation to the vertical. Thus it is possible for the second rotation axis of the sweeper element to be arranged at an angle which is greater than 0 in relation to the vertical longitudinal plane and wherein the first angle is such that the second rotation axis, viewed from the vertical and viewed in a vertical transverse plane standing perpendicular to the vertical longitudinal plane, is tilted in relation to the rotation direction of the rotating body.

The second rotation axis of the sweeper element is arranged at the first angle in relation to the vertical longitudinal plane. The sweeper element thus moves on its rotation from top to bottom out of the starting position next to the path of the shovel-holders to around the centre position in the passing shovel-holder. While the sweeper element rotates from the centre position out of the passing shovel-holder, the sweeper element then moves from bottom to top. The first angle is for example between 0-30°.

Furthermore, the second rotation axis can run at a second angle which is greater than 0 in relation to the vertical transverse plane, and wherein the second angle is such that the second rotation axis, viewed in the displacement direction of the carrier frame, runs obliquely downwards. Thus the rotation movement of the sweeper element can be matched more precisely to the rotation movement of the passing shovel-holder, so that the sweeper element sweeps relatively deeply through the passing shovel-holder without damaging the passing shovel-holder. The second angle is for example between 0-30°.

The invention also relates to a method for removing dirt from a floor, for example from the floor of a stall, which method comprises:

the movement of a device over the floor, which device comprises
a carrier frame,
a motor which is mounted on the carrier frame,
a rotating body which is rotatable in one direction of rotation about a first substantially horizontal rotation axis and is connected with the carrier frame, which rotating body is drivable by the motor,
several shovel-holders for shovelling the dirt from the floor, which shovel-holders are mounted on the rotating body spaced apart from each other in the peripheral direction, and which shovel-holders on rotation of the rotating body move along a path which runs at least partly along the floor, and which shovel-holders each comprise a trough-shaped wall which delimits an internal receiving cavity for receiving the shovelled dirt, and which shovel-holders each comprise an open end which is substantially oriented in the rotation direction of the rotating body,
a sweeper device for sweeping the dirt in each case out of one of the shovel-holders on rotation of the rotating body, which sweeper device is arranged along the path of the shovel-holders on the carrier frame at a position which is substantially stationary in relation to the carrier frame, which sweeper device is fitted with a moveable and driveable sweeper element,
the rotation of the rotating body in one rotation direction about the first substantially horizontal rotation axis by means of driving the rotating body by the motor,
the displacement of the sweeping element during rotation of the rotating body, for each shovel-holder which passes the sweeper device, from a starting position outside the path of the shovel-holders into the path of the shovel-holders, through the open end of the passing shovel-holder into the internal receiving cavity of the passing shovel-holder and then on through the internal receiving cavity of the passing shovel-holder in order to sweep out at least a quantity of the dirt shovelled up by the passing shovel-holder, and then displacement of the sweeper element out of the passing shovel-holder and then away out of the path of the shovel-holders in order to allow the passing shovel-holder to pass by the sweeper device.

This method has the same effects and advantages as described above and the properties described above can also be applied to this method.

BRIEF DESCRIPTION OF THE DRAWINGS

The features and advantages of the invention will be appreciated upon reference to the following drawings, in which:

FIG. 3a shows an enlarged detailed IIIa from FIG. 2a.

DESCRIPTION OF ILLUSTRATIVE EMBODIMENTS

Figure 1:
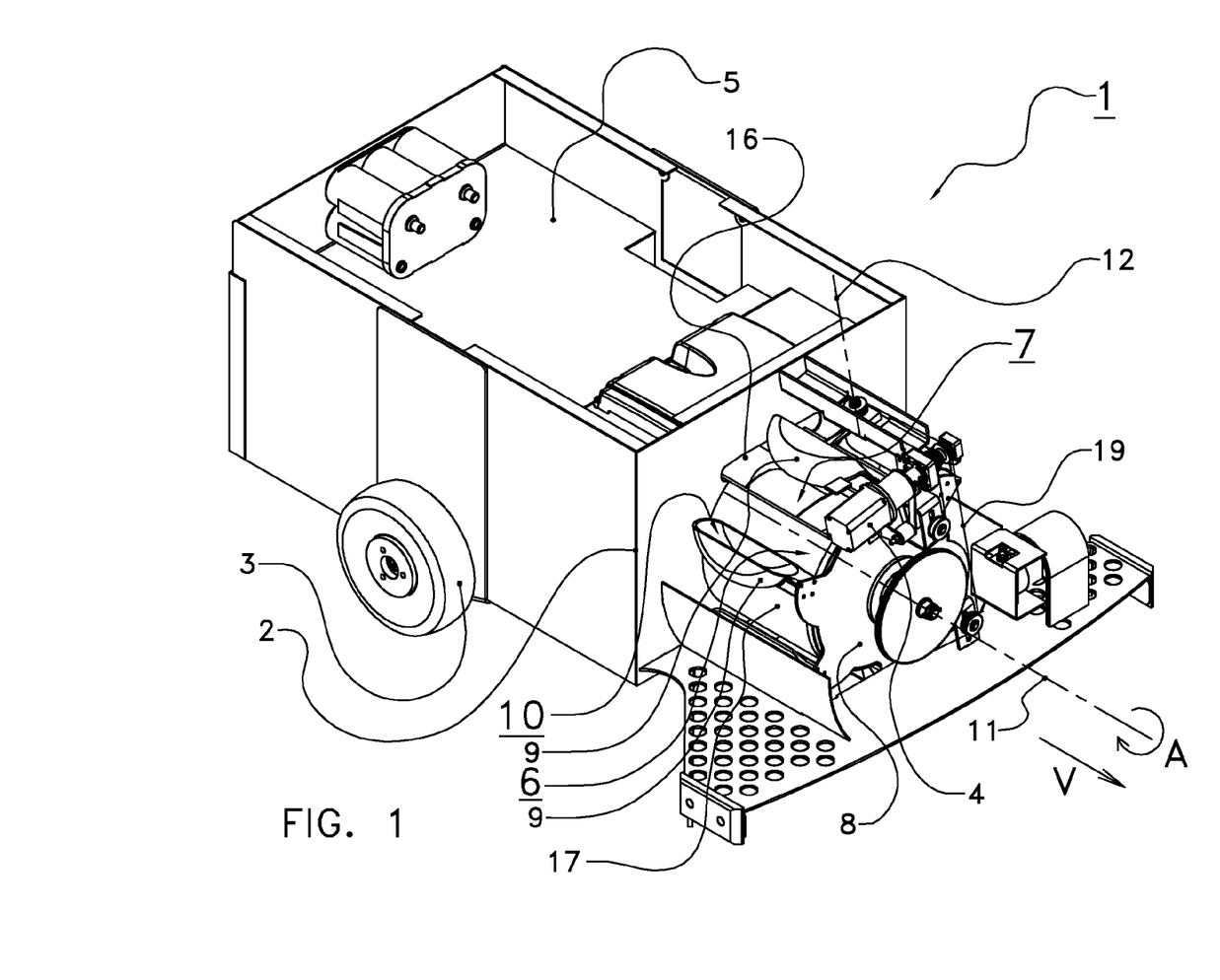
FIG. 1 shows a perspective view of the device for removing dirt from the floor according to the invention.

The following is a description of certain embodiments of the invention, given by way of example only and with reference to the drawings. The device shown in FIG. 1 for removing dirt from a floor is indicated as a whole with reference numeral 1. The device 1 is used for example to remove relatively thick dung from the floor of a stall. The device 1 in this embodiment example is designed as a vehicle. The vehicle 1 comprises a carrier 2 and wheels 3 with which the vehicle 1 can travel over the floor. The wheels 3 in this embodiment example can be driven by a drive device. The wheels 3 can be driven independently of each other so that the vehicle 1 can be steered. The vehicle 1 can also be designed to be non-self-propelling.

The vehicle 1 comprises a storage tank 5 for the dirt removed from the floor. The storage tank 5 is connected via a passage opening 16 with a catchment tray 6 to capture the dirt which is shovelled by the shovel-holders 9 from the floor, as will be described in more detail below. The catchment tray 6 on its top has a catchment opening 7 through which the shovelled dirt can fall from the shovel-holders 9 into the catchment tray 6.

In this embodiment example, the catchment tray 6 comprises a substantially cylindrical peripheral wall 17 which is arranged parallel to the longitudinal axis of the device. The catchment tray at the front is closed by an end wall. At the opposite rear end of the catchment tray 6 is the passage opening 16 which opens into the storage tank 5. The catchment opening 7 on the top of the catchment tray 6 forms a side opening in the peripheral wall 17.

In the catchment tray 6 is a displacement element for pushing the dirt captured in the catchment tray 6 through the passage opening 16 to the storage tank 5. The displacement element can be driven by a motor 4 which is arranged on the carrier frame 2. The displacement element comprises for example a transport screw with an external diameter which largely corresponds to the internal diameter of the cylindrical peripheral wall 17. The displacement element prevents the passage opening 16 from becoming clogged by the swept dirt, for example which contains relatively thick and sticky dung.

The shovel-holders 9 for shovelling dirt from the floor are attached to a rotating body 8 rotatable in a rotation direction (see arrow A in FIG. 1) about a first substantially horizontal rotation axis 11 which is connected with the carrier frame 2. The first rotation axis 11 runs substantially parallel to the longitudinal axis of the vehicle 1. The rotating body 8 can be driven by the motor 4 which also drives the displacement element in the catchment tray 6.

In this embodiment example, the rotating body 8 is designed as a plate-like turntable. The shovel-holders 9 are attached transversely to the back of the turntable 8. The shovel-holders 9 are arranged substantially in a circle spaced apart in the peripheral direction.

On rotation of the rotating body 8, the shovel-holders 9 describe a substantially circular path which runs partly adjacent to the floor. The shovel-holders 9 thus move from a lower shovel position to an upper release position and back. The shovel-holders 9 each comprise a trough-shaped wall which is delimited by a peripheral edge. The peripheral edge of each shovel-holder 9 determines an open end 10 which is oriented substantially in the rotation direction A of the rotating body 8.

In the lower shovel position of the shovel-holders 9, the lowest part of the peripheral edge thereof moves along the floor to shovel dirt up from the floor. The carrier frame 2 is provided on its side facing the floor with collection bars 18 for collecting dirt present on the floor when the vehicle 1 travels over the floor. The path of the shovel-holders 9 runs between the collector bars 18. The shovel-holders 9 are then at least partly filled with dirt.

From each shovel-holder, in its upper release position when the shovel-holder 9 is above the catchment opening 7 of the catchment tray 6, a quantity of the shovelled dirt is removed by a sweeper device 14. The sweeper device 14 is located along the path of the shovel-holders 9 at a position which is substantially stationary in relation to the carrier frame 2 next to the upper release position of the shovel-holders 9. The sweeper device 14 in this embodiment example comprises a sweeper element or blade 15 which is rotatable about a second rotation axis 12. The second rotation axis 12 runs substantially transverse to the first substantially horizontal rotation axis of the rotating body 8.

The sweeper element 15 can be driven by the motor 4 which also drives the rotating body 8 and the displacement element in the catchment tray 6. In this embodiment example, the common motor 4 comprises an output motor shaft connected with a drive belt 19 which drives both the rotating body 8, the sweeper element 15 and the displacement element in the catchment tray 6.

Figure 3A:
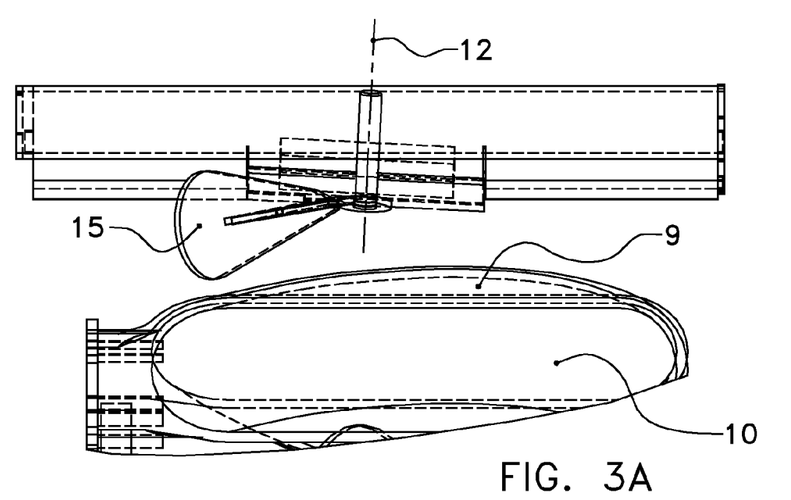
Figure 3B:
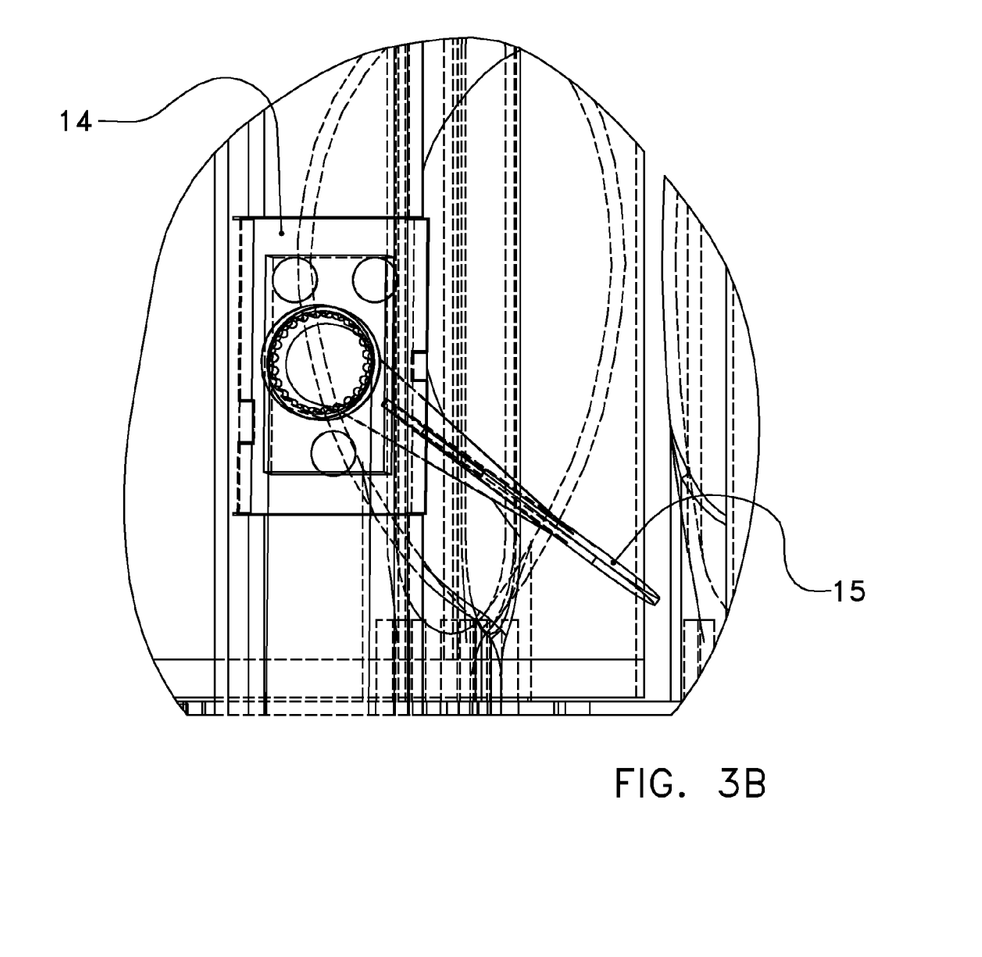
FIG. 3b shows an enlarged detailed IIIb from FIG. 2c.

The removal of dirt from the shovel-holders 9 is shown in more detail in FIGS. 3*a*, 3*b*, 4*a*, 4*b*, 5*a*, 5*b*, 6*a* and 6*b*. In FIGS. 3*a* and 3*b*, the sweeper element 15 is in a starting position outside the circular path of the shovel-holders 9. Due to the rotation of the rotating body 8, one of the shovel-holders 9 approaches the sweeper element 15. From the starting position the sweeper element 15 is moved by its rotation into the path of the shovel-holders 9 during rotation of the rotating body 8. The sweeper element 15 thus rotates into the path of the shovel-holders 9 between two adjacent shovel-holders 9.

Figure 4A:
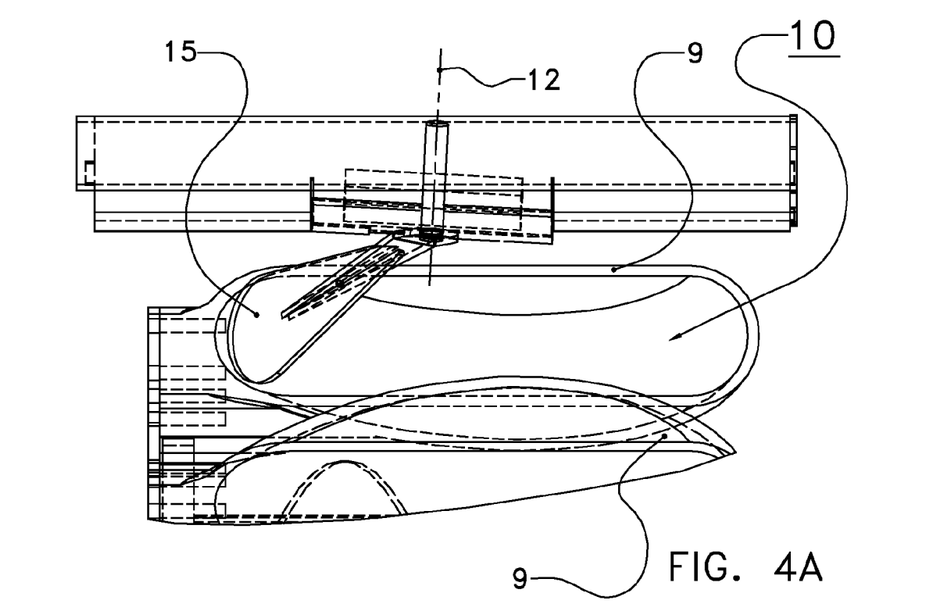
FIGS. 4a, 4b, 5a, 5b, 6a and 6b show various stages of the sweeper element and a passing shovel-holder of the device shown in FIG. 1.
Figure 4B:
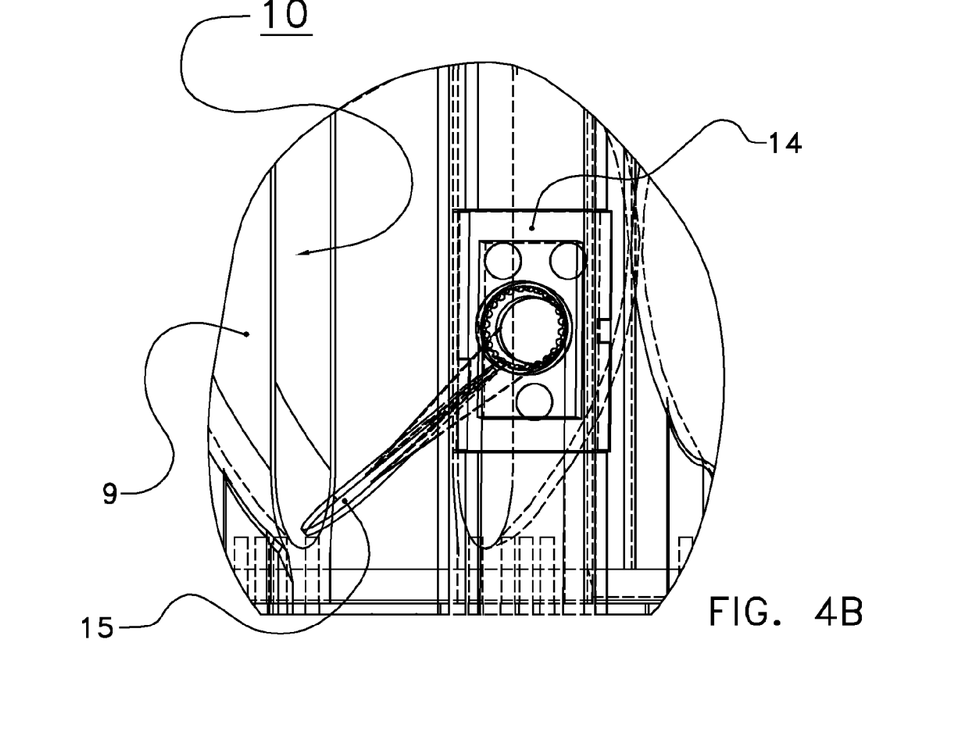
Figure 5A:
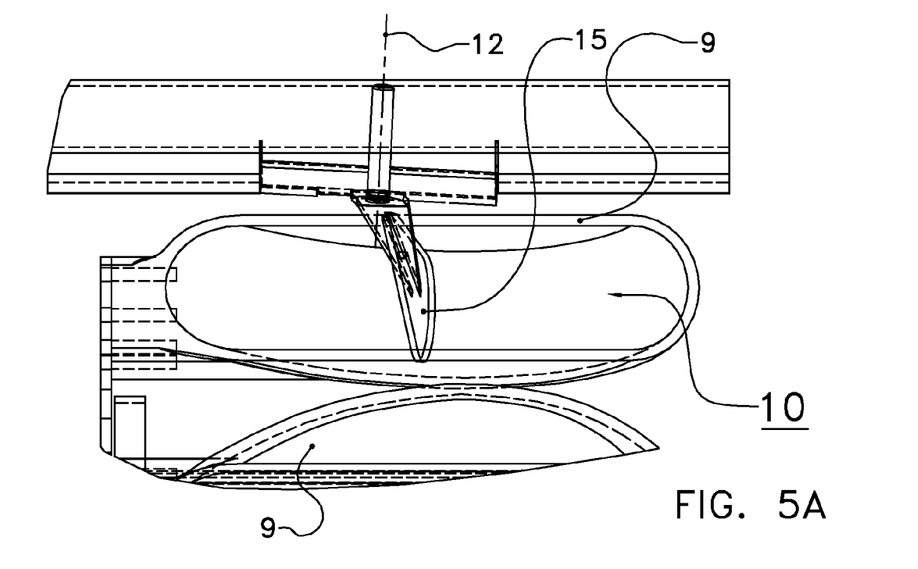
Figure 5B:
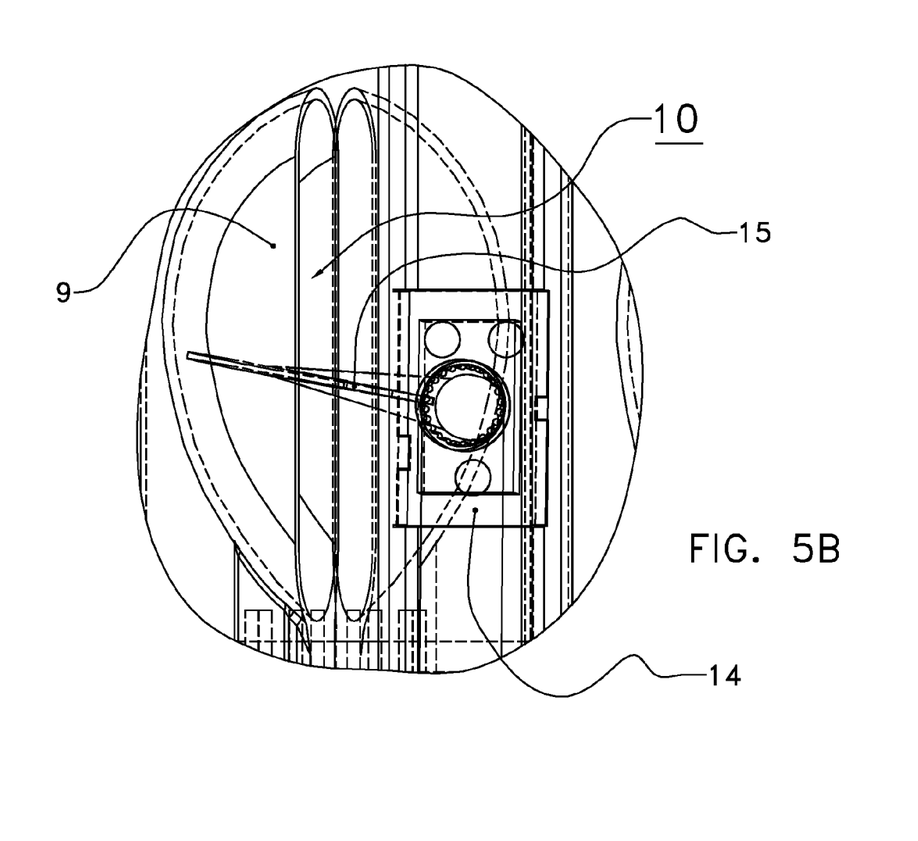
Figure 6A:
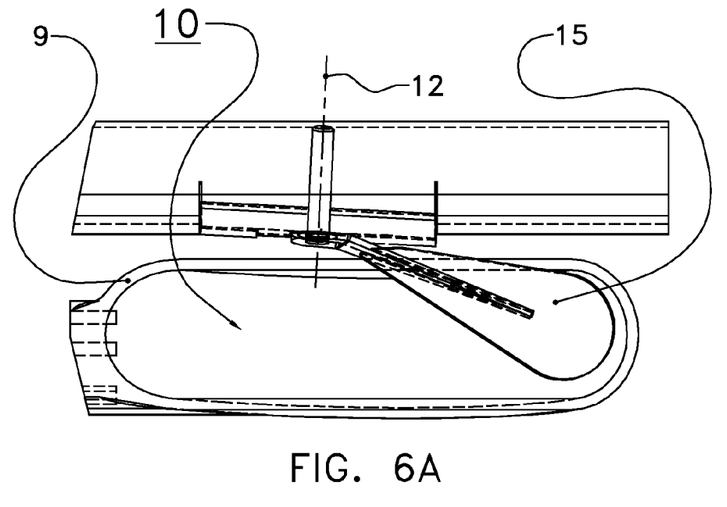
Figure 6B:
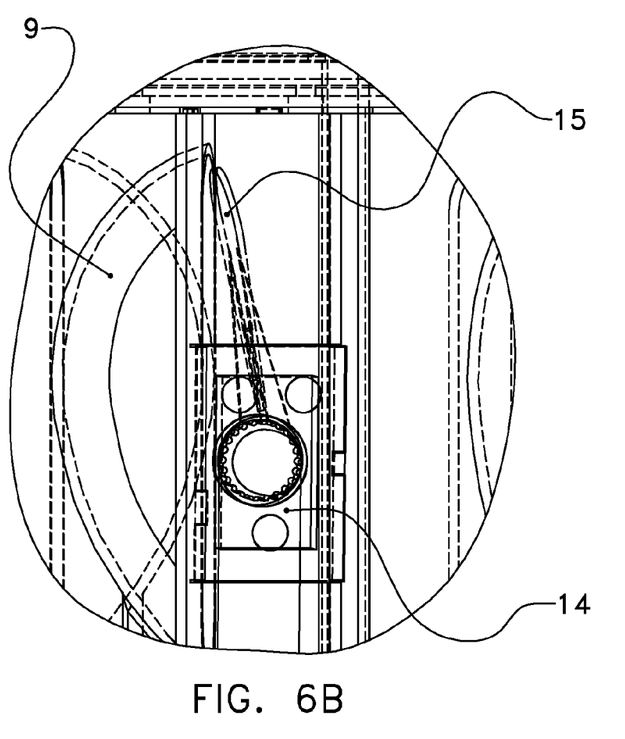

Then the sweeper element 15 moves through the open end 10 into the approaching and then passing shovel-holder 9 (see FIGS. 4*a* and 4*b*). Then the sweeper element 15 moves on through the passing shovel-holder 9 in order to remove at least a quantity of the dirt shovelled therein. In FIGS. 5*a* and 5*b* the sweeper element 15 is in the centre of the passing shovel-holder 9, whereas FIGS. 6*a* and 6*b* show that the sweeper element 15 moves out of the passing shovel-holder 9. The sweeper element 15 is then moved out of the starting position over an angle of around 180° from front to back through the passing shovel-holder 9. The dirt swept from the passing shovel-holder 9 falls through the catchment opening 7 into the catchment tray 6.

After the sweeper element 15 has moved out of the passing shovel-holder 9, the sweeper element 15 moves away out of the path of the shovel-holders 9 so that the swept shovel-holder 9 can pass by the sweeper element 15. The sweeper element 15 then rotates further behind this swept shovel-holder 9 in front of the shovel-holder 15 filled with shovelled dirt which, viewed in rotation direction A of the rotating body 8, is the first to follow after the swept shovel-holder 9 which has just passed. The sweeper element rotates over an angle of around 180° from back to front, back to the starting position which is shown in FIGS. 3*a* and 3*b*.

The sweeper element therefore in each case performs a complete revolution between the shovel-holders 9, whereby in each case one of the shovel-holders 9 is swept to remove at least a quantity of dirt therefrom.

In this embodiment example, the rotating body 8 with shovel-holders 9 attached thereto and the sweeper element 15 are driven by the motor 4 to perform a uniform rotation movement. The second rotation axis 12 of the sweeper element 15 is set in relation to the first rotation axis 11 of the rotating body 8 so that the sweeper element 15 is moved relatively deeply through the shovel-holders 9 without touching the shovel-holders 9.

Figure 2A:
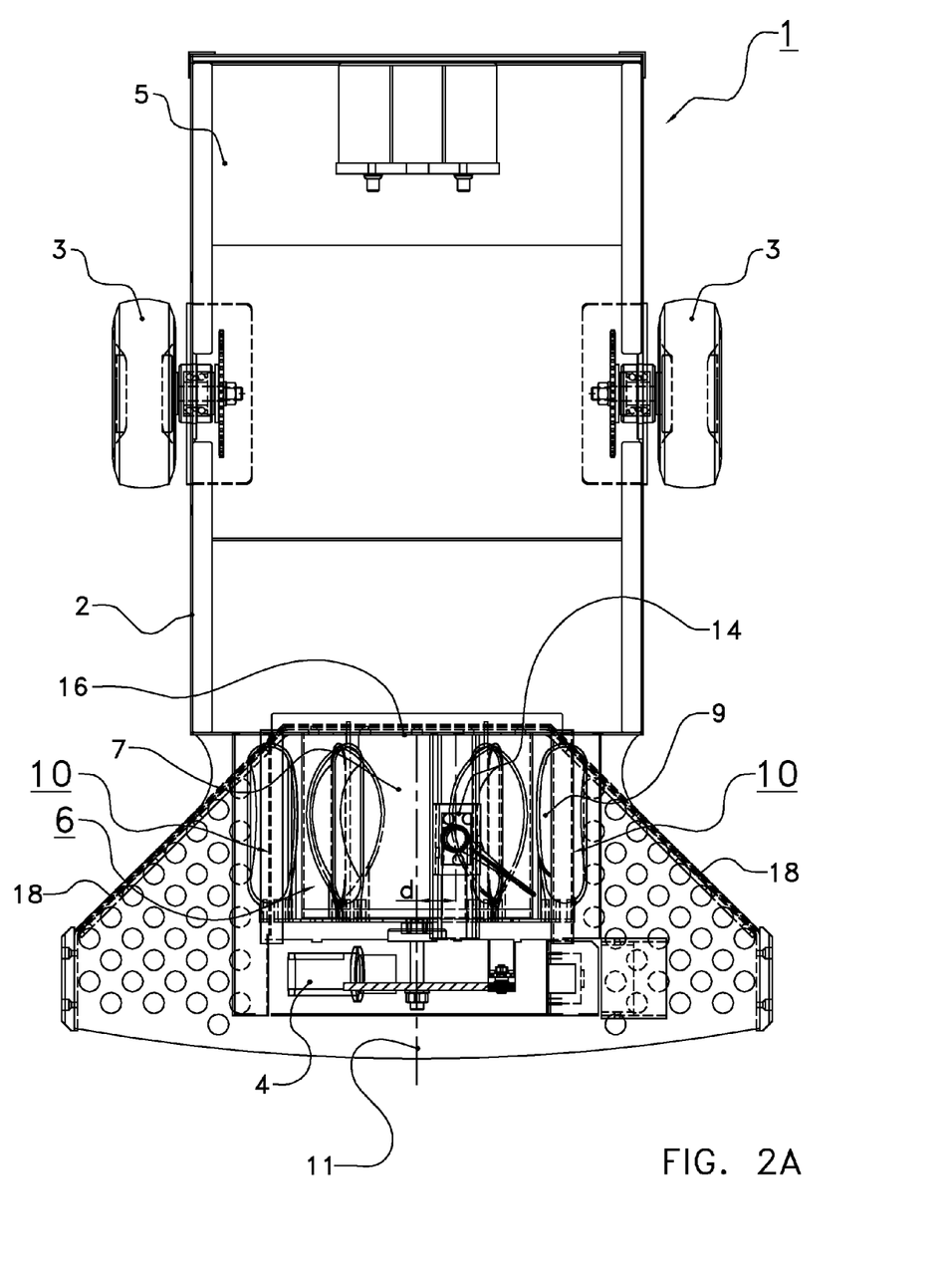
FIGS. 2a, 2b, 2c show a top view, a front view and a side view of the device shown in FIG. 1.

For this, the centre of rotation of the sweeper element 15 determined by the second rotation axis is arranged at a slight distance d (see FIG. 2*a*) from the vertical longitudinal plane of the vehicle 1. The vertical longitudinal plane of the vehicle 1 in this embodiment example is determined by a vertical plane through the first horizontal rotation axis 11 of the rotating body 8.

Therefore the second rotation axis 12 of the sweeper element 15 is offset in relation to the first horizontal rotation axis 11 of the rotating body 8. As the sweeper element 15 has a certain length, the rotation of the sweeper element 15 can be adjusted by setting the distance d such that the sweeper element 15 is substantially in the centre of the shovel-holder 9 in the upper release position of the passing shovel-holder 9, as shown in FIGS. 5a and 5b.

Figure 2B:
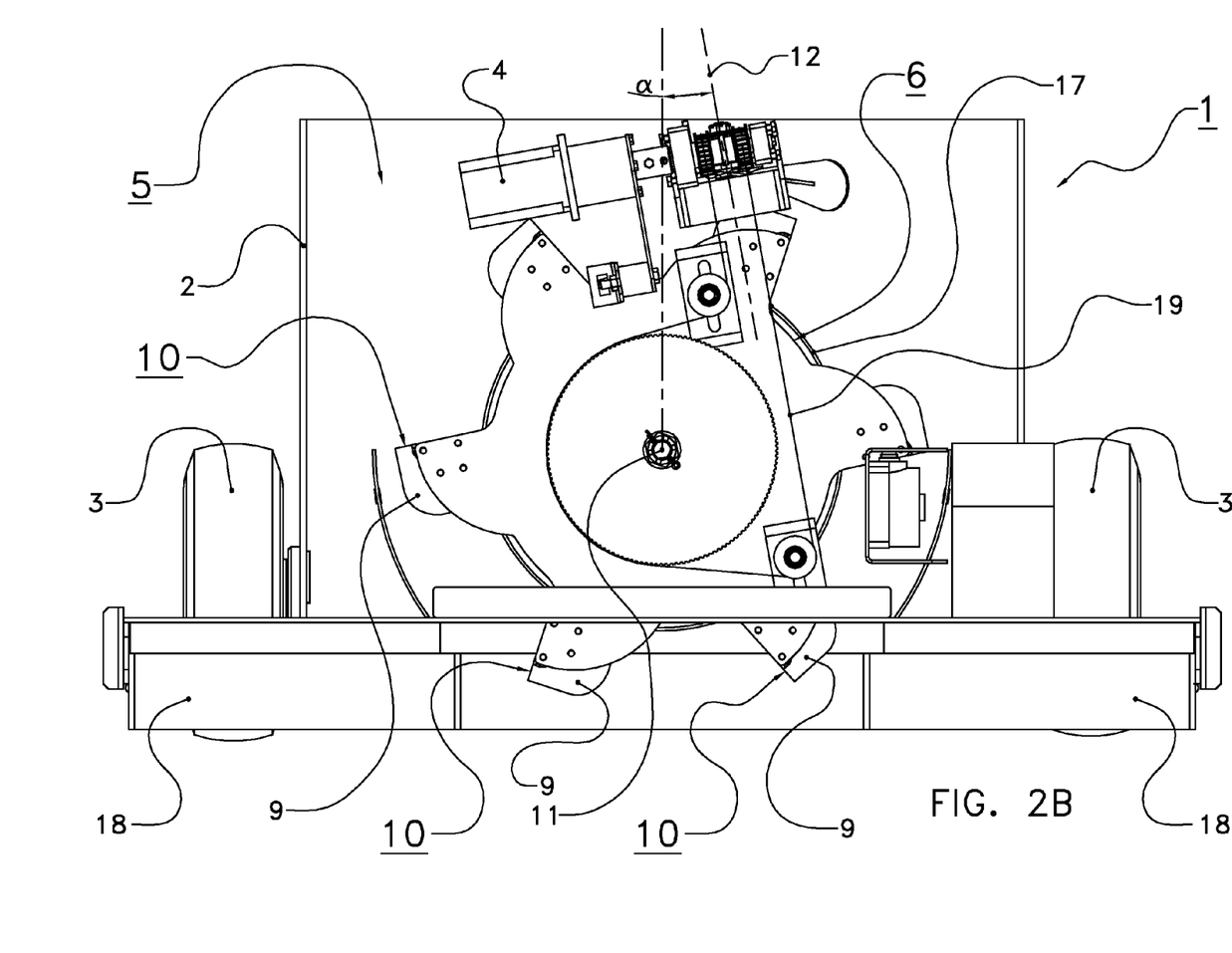

In addition, the second rotation axis 12 of the sweeper element 15 is not precisely vertical in this embodiment example. The second rotation axis 12 of the sweeper element 15 is arranged at a first angle α (see FIG. 2b) in relation to the vertical plane. The first angle α is selected such that the second rotation axis 15, viewed from the vertical and viewed in a vertical transverse plane which stands perpendicular to the vertical longitudinal plane, is tilted in relation to the rotation direction A of the rotating body 15.

The sweeper element 15 moves on its rotation from top to bottom from the starting position towards the path of the shovel-holders 9, to around the centre position in the passing shovel-holder 9. While the sweeper element 15 rotates from the centre position out of the passing shovel-holder 9, the sweeper element 15 then moves from bottom to top. The first angle α is for example between 0 and 30°.

Figure 2C:
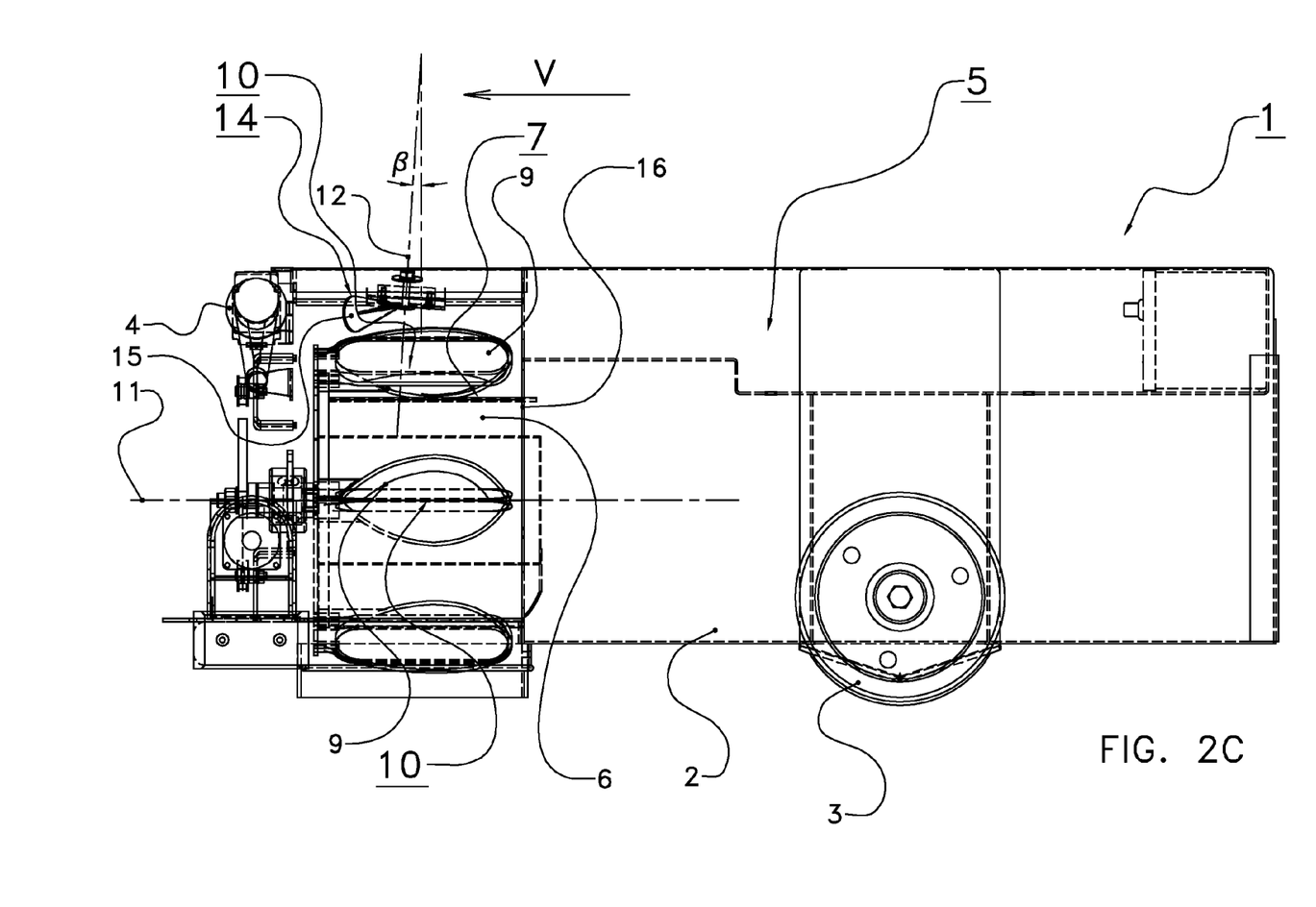

Furthermore, the second rotation axis 12 can run at a second angle β (see FIG. 2c) in relation to the vertical transverse plane. The second angle β is such that the second rotation axis 12, viewed in the displacement direction V of the vehicle 1, runs obliquely downwards. Thus the rotation movement of the sweeper element 15 can be adapted more precisely to the rotation movement of the passing shovel-holder 9, so that the sweeper element 15 sweeps relatively deeply through the passing shovel-holder 9 without damaging the passing shovel-holder. The second angle β is for example between 0 and 30°.

To further improve the removal of dirt from the shovel-holders 9, the trough-shaped wall of each shovel-holder 9 can have a curved inner surface, the curvature of which is such that the sweeper element 15, on its rotation about the second rotation axis 12 and on rotation of the rotating body 8 about the first rotation axis 11, moves through the shovel-holder 9 at a substantially constant distance from the curved inner surface. The form of the shovel-holders 9 is then asymmetric Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for removing dirt from a floor, comprising:
a carrier frame moveable over the floor,
a motor mounted on the carrier frame,
a rotating body rotatable in one direction of rotation about a first substantially horizontal rotation axis and connected with the carrier frame, the rotating body being drivable by the motor,
several shovel-holders for shovelling the dirt from the floor, the shovel-holders are mounted on the rotating body spaced apart from each other in the peripheral direction and the shovel-holders on rotation of the rotating body move along a path which runs at least partly along the floor, and the shovel-holders each comprise a trough-shaped wall which delimits an internal receiving cavity for receiving the shovelled dirt, and the shovel-holders each comprise an open end which is substantially oriented in the rotation direction of the rotating body,
a sweeper device for sweeping the dirt in each case out of one of the shovel-holders on rotation of the rotating body, the sweeper device is arranged along the path of the shovel-holders on the carrier frame at a position which is substantially stationary in relation to the carrier frame, the sweeper device is fitted with a sweeper element that is moveable and driveable such that the sweeper element, on rotation of the rotating body, for each shovel-holder which passes the sweeper device, moves from a starting position outside the path of the shovel-holders into the path of the shovel-holders, through the open end of the passing shovel-holder into the internal receiving cavity of the passing shovel-holder and then on through the internal receiving cavity of the passing shovel-holder in order to sweep out at least a quantity of the dirt shovelled up by the passing shovel-holder, and the sweeper element then moves out of the passing shovel-holder and then away out of the path of the shovel-holders in order to allow the passing shovel-holder to pass by the sweeper device.

2. The device according to claim 1, wherein the sweeper element is moveable and driveable such that the sweeper element on rotation of the rotating body, for each shovel-holder which passes the sweeper device, in each case moves back through the path of the shovel-holders to the starting position outside the path of the shovel holders after the passing shovel-holder has passed by the sweeper device.

3. The device according to claim 1, wherein the shovel-holders are arranged substantially in a circle spaced apart in a peripheral direction, and wherein the path of the shovel-holders is substantially circular.

4. The device according to claim 1, wherein the device is a vehicle and wherein the carrier frame travels in a direction of travel over the floor.

5. The device according to claim 1, wherein the shovel-holders, on rotation of the rotating body, swivel from a lower shovel position to an upper release position and back, and wherein the sweeper device is arranged at the upper release position of the shovel-holders.

6. The device according to claim 1, wherein the device is fitted with a catchment tray for catching the dirt swept from each shovel-holder on passing by the sweeper device, and wherein the catchment tray is fitted with a catchment opening arranged below the sweeper device.

7. The device according to claim 6, wherein the device is fitted with a storage tank which is connected with the catchment tray via a passage opening, and wherein the catchment tray is fitted with a displacement element for moving the dirt captured in the catchment tray to the storage tank.

8. The device according to claim 7, wherein the catchment tray has a substantially cylindrically peripheral wall in which a side opening is provided to form the catchment opening on the top of the catchment tray, and wherein the displacement element comprises a transport screw to push the dirt captured in the catchment tray through the passage opening to the storage tank.

9. The device according to claim 1, wherein the first rotation axis of the rotating body runs substantially parallel to the longitudinal axis of the device.

10. The device according to claim 1, wherein the carrier frame on its side facing the floor is fitted with collection bars for collecting the dirt present on the floor on movement of the device over the floor, and wherein the path of the shovel-holders runs between the collection bars.

11. The device according to claim 1, wherein the sweeper element is drivable by the motor.

12. The device according to claim 1, wherein the sweeper element is rotatable about a second rotation axis and is connected with the sweeper device, wherein the sweeper element is moveable and driveable such that the sweeper element, on its rotation about the second rotation axis and on rotation of the rotating body about the first rotation axis, for each shovel-holder which passes the sweeper device, performs one complete revolution in each case from the starting position outside the path of the shovel-holders.

13. The device according to claim 12, wherein the rotating body and the sweeper element are driveably connected with the motor such that, when the rotating body and the sweeper element are driven by the motor, the sweeper element rotates N x as fast about the second rotation axis as the rotating body rotates about the first rotation axis, wherein N is the number of shovel-holders of the rotating body.

14. The device according to claim 13, wherein the sweeper element is driveable for performing a uniform rotation movement.

15. The device according to claim 12, wherein the trough-shaped wall of each shovel-holder has a curved inner surface, the curvature of which is such that the sweeper element, on its rotation about the second rotation axis and on rotation of the rotating body about the first rotation axis, moves through the internal receiving cavity of the passing shovel-holder at a substantially constant distance from the curved inner surface in order to sweep out at least a quantity of the dirt shovelled up by the passing shovel-holder.

16. The device according to claim 12, wherein the device comprises a vertical longitudinal plane which is determined by a vertical plane through the first horizontal rotation axis of the rotating body, and wherein the centre of rotation of the sweeper element which is determined by the second rotation axis is arranged at a distance which is greater than 0 from the vertical longitudinal plane.

17. The device according to claim 16, wherein the second rotation axis of the sweeper element runs obliquely in relation to the vertical.

18. The device according to claim 17, wherein the second rotation axis of the sweeper element is arranged at a first angle ($\alpha$) which is greater than 0 in relation to the vertical longitudinal plane, and wherein the first angle ($\alpha$) is such that the second rotation axis, viewed from the vertical and viewed in a vertical transverse plane standing perpendicular to the vertical longitudinal plane, is tilted in relation to the rotation direction of the rotating body.

19. The device according to claim 18, wherein the first angle ($\alpha$) is between 0 and 30°.

20. The device according to claim 18, wherein the second rotation axis runs at a second angle ($\beta$) which is greater than 0 in relation to the vertical transverse plane, and wherein the second angle ($\beta$) is such that the second rotation axis, viewed in the displacement direction of the device, runs obliquely downwards.

21. The device according to claim 20, wherein the second angle ($\beta$) is between 0 and 30°.

22. The device according to claim 1, wherein the rotating body is driveable by the motor to perform a uniform rotation movement.

23. The device according to claim 1, wherein the rotating body comprises a crawler track, and wherein the crawler track extends over a predetermined distance substantially parallel to the floor.

24. A method for removing dirt from a floor, comprising:
moving a device over the floor, the device comprising:
a carrier frame,
a motor mounted on the carrier frame,
a rotating body rotatable in one direction of rotation about a first substantially horizontal rotation axis and connected with the carrier frame, which rotating body is drivable by the motor,
several shovel-holders for shovelling the dirt from the floor, the shovel-holders are mounted on the rotating body spaced apart from each other in the peripheral direction, and the shovel-holders on rotation of the rotating body move along a path which runs at least partly along the floor, and the shovel holders each comprise a trough-shaped wall which delimits an internal receiving cavity for receiving the shovelled dirt, and the shovel-holders each comprise an open end which is substantially oriented in the rotation direction of the rotating body,
a sweeper device for sweeping the dirt in each case out of one of the shovel holders on rotation of the rotating body, the sweeper device is arranged along the path of the shovel-holders on the carrier frame at a position which is substantially stationary in relation to the carrier frame, the sweeper device is fitted with a moveable and driveable sweeper element,
the rotation of the rotating body in one rotation direction about the first substantially horizontal rotation axis via driving the rotating body by the motor,
the displacement of the sweeping element during rotation of the rotating body, for each shovel-holder which passes the sweeper device, from a starting position outside the path of the shovel-holders into the path of the shovel-holders, through the open end of the passing shovel-holder into the internal receiving cavity of the passing shovel-holder and then on through the internal receiving cavity of the passing shovel-holder in order to sweep out at least a quantity of the dirt shovelled up by the passing shovel-holder, and then displacement of the sweeper element out of the passing shovel-holder and then away out of the path of the shovel-holders in order to allow the passing shovel-holder to pass by the sweeper device.

* * * * *